US012579894B2

(12) United States Patent
Schlueter

(10) Patent No.: US 12,579,894 B2
(45) Date of Patent: Mar. 17, 2026

(54) MULTI-LANE TRAFFIC MANAGEMENT SYSTEM FOR PLATOONS OF AUTONOMOUS VEHICLES

(71) Applicant: Georg Schlueter, San Marcos, CA (US)

(72) Inventor: Georg Schlueter, San Marcos, CA (US)

(73) Assignee: HANSA TEKNETICS LLC, San Marcos, CA (US)

( * ) Notice: Subject to any disclaimer, the term of this patent is extended or adjusted under 35 U.S.C. 154(b) by 315 days.

(21) Appl. No.: 17/730,411

(22) Filed: Apr. 27, 2022

(65) Prior Publication Data

US 2023/0351897 A1     Nov. 2, 2023

(51) Int. Cl.
*G08G 1/00*        (2006.01)
*B60W 30/165*      (2020.01)
(Continued)

(52) U.S. Cl.
CPC ............. *G08G 1/22* (2013.01); *B60W 30/165* (2013.01); *G05D 1/0293* (2013.01); *G08G 1/166* (2013.01); *G08G 1/167* (2013.01)

(58) Field of Classification Search
CPC .......... G08G 1/22; G08G 1/166; G08G 1/167; G08G 1/0145; B60W 30/165; G05D 1/0293
(Continued)

(56) References Cited

U.S. PATENT DOCUMENTS 9,547,986 B1 * 1/2017 Curlander ................ G08G 1/04
11,367,358 B1 * 6/2022 Vemuri .................... G08G 1/22
(Continued)

FOREIGN PATENT DOCUMENTS

GB      2572210 A       9/2019
SE      1650608 A1 *    2/2017

OTHER PUBLICATIONS

Zhong, Zijia; Lee, Joyoung; "The Effictiveness of Managed Lane Strategies for the Near-term Deployment of Cooperative Adaptive Cruise Control"; Sep. 4, 2019; Elsevier; arXiv:1908.10404v2 (Year: 2019).*

(Continued)

*Primary Examiner* — Tiffany P Young
*Assistant Examiner* — Leah N Miller
(74) *Attorney, Agent, or Firm* — ARC IP Law, PC; Joseph J. Mayo

(57)                ABSTRACT

A traffic management system for multi-lane roads that manages all traffic on dedicated lanes to achieve much higher rates of traffic flow compared to existing freeways. Managed lanes consist entirely of platoons of autonomous vehicles that have a regular, repeating structure. Intra-platoon and inter-platoon spacing is tightly controlled to increase vehicle density. Vehicle speeds differ on different lanes, which greatly simplifies lane changes since vehicles can wait until an open slot on an adjacent lane lines up with the vehicle before changing lanes, thereby eliminating traffic disruption. Trucks may be allowed only on certain lanes, so that cars-only lanes can move at higher speeds with tighter vehicle packing. Platoons in each lane consist of a fixed number of slots of fixed length; vehicles may occupy one or more slots. An unmanaged lane is reserved for manually drive vehicles and for vehicles entering and exiting the road.

20 Claims, 11 Drawing Sheets

(51) Int. Cl.
  *G05D 1/00*   (2024.01)
  *G08G 1/16*   (2006.01)
(58) Field of Classification Search
  USPC .......................................................... 701/117
  See application file for complete search history.

(56)     References Cited

U.S. PATENT DOCUMENTS

| | | | |
|---|---|---|---|
| 2006/0229800 A1* | 10/2006 | Aronin ..................... | G08G 1/00 |
| | | | 340/936 |
| 2019/0051158 A1* | 2/2019 | Felip Leon .............. | G08G 1/22 |
| 2019/0294180 A1* | 9/2019 | Reinhart ............. | B60W 30/165 |
| 2020/0384997 A1* | 12/2020 | Lacaze ................ | B60W 30/165 |
| 2021/0056854 A1* | 2/2021 | Ucar .................... | G05D 1/0295 |
| 2021/0294352 A1* | 9/2021 | Kessler ................ | G08G 1/0145 |

OTHER PUBLICATIONS

Fontaine, M. D., Bhamidipati, C. S., & Dougald, L. E. (2009). Safety Impact of Truck Lane Restrictions on Multilane Freeways. Transportation Research Record, 2096(1), 25-32. https://doi.org/10.3141/2096-04 (Year: 2009).*

M. B. Younes, A. Boukerche and R. W. L. Coutinho, "An Efficient Freeway Driving Assistance Protocol in Vehicular Networks," 2019 IEEE Global Communications Conference (GLOBECOM), Waikoloa, HI, USA, 2019, pp. 1-6, doi: 10.1109/GLOBECOM38437.2019.9014104. (Year: 2019).*

T.-S. Dao, C. M. Clark and J. P. Huissoon, "Optimized Lane Assignment Using Inter-Vehicle Communication, " 2007 IEEE Intelligent Vehicles Symposium, Istanbul, Turkey, 2007, pp. 1217-1222, doi: 10.1109/IVS.2007.4290284. (Year: 2007).*

S. Nahavandi et al., "Autonomous Convoying: A Survey on Current Research and Development," in IEEE Access, vol. 10, pp. 13663-13683, 2022, doi: 10.1109/ACCESS.2022.3147251. (Year: 2022).*

D. Marinescu, J. Čurn, M. Slot, M. Bouroche and V. Cahill, "An active approach to guaranteed arrival times based on traffic shaping," 13th International IEEE Conference on Intelligent Transportation Systems, Funchal, Portugal, 2010, pp. 1711-1717, doi: 10.1109/ITSC.2010.5625197. (Year: 2010).*

Sala, Marcel, et al., "Capacity of a freeway lane with platoons of autonomous vehicles mixed with regular traffic", Elsevier Ltd., published Apr. 4, 2021 (116 pages).

Hallé, Simon, "Automated Highway Systems: Platoons of Vehicles Viewed as a Multiagent System", Faculté Des Sciences et de Genie Université Laval Québec, Jun. 2005 (194 pages).

Santini, et al., "Platooning Maneuvers in Vehicular Networks a Distributed and Consensus-Based Approach", IEEE 2018 (13 pages).

Lockwood, Rolf, "Truck Platooning, Past, Present, and Future" Fuel Smarts; Apr. 8, 2016 (8 pages).

Lee, et al., "Impact of Automated Truck Platooning on the Performance of Freeway Mixed Traffic Flow", Journal of Advanced Transportation, vol. 2021, 13 pages.

Mladen Cicic, "Control of vehicle platoons and traffic dynamics: catch-up coordination and congestion dissipation"; Licentiate Thesis in Electrical Engineering, School of Electrical Engineering and Computer Science, 2019 (95 pages).

Amoozadeh, et al., "Platoon Management with Cooperative Adaptive Cruise Control Enabled by VANET", Vehicular Communications Journal, Apr. 2015 (15 pages).

Tomizuka, et al., "Control Issues in Automated Highway Systems", IEEE Control Systems, Jan. 1995 (13 pages).

* cited by examiner

FIG. 8

Illustrative Traffic Flow Parameters

| Parameter | | | Lane 4 | Lane 3 | Lane 2 | Lane 1 |
|---|---|---|---|---|---|---|
| | | | | 713 | 712 | 711 |
| | | | | Lanes | | |
| Platoon Clearance, Truck Section | ft | TCTx (802) | N/A | 32.33 | - | - |
| Platoon Clearance Car Section | ft | TCCx (803) | N/A | 17.67 | 17.67 | 17.67 |
| Space Holder Clearance Trucks | ft | SHCTx | N/A | 5.00 | - | - |
| Space Holder Clearance Cars | ft | SHCCx | N/A | 1.00 | 1.00 | 1.00 |
| Space Holder Length Trucks | ft | SHLTx | N/A | 80.00 | - | - |
| Space Holder Length Cars | ft | SHLCx | N/A | 23.00 | 23.00 | 23.00 |
| Number of Space Holders, Trucks | # | SHNTx | N/A | 2.00 | - | - |
| Number of Space Holders, Cars | # | SHNCx | N/A | 5.00 | 8.00 | 8.00 |
| Platoon Velocity | mph | Vx | 55 | 65.00 | 75.00 | 85.00 |

Calculated Performance

|  |  |  | Lane 4 | Lane 3 | Lane 2 | Lane 1 |
|---|---|---|---|---|---|---|
| Platoon Length Trucks | ft | TLTx | N/A | 197.3 |  |  |
| Platoon Length Cars | ft | TLCx | N/A | 136.7 |  |  |
| Platoon Length | ft | TLx | N/A | 334.0 | 208.7 | 208.7 |
| Vehicle Density Trucks | cpm | VDTx | N/A | 31.6 |  |  |
| Vehicle Density Cars | cpm | VDCx | N/A | 79.0 | 202.4 | 202.4 |
| Lane Usage Trucks | cph | LUTx | N/A | 2,055.1 |  |  |
| Lane Usage Cars | cph | LUCx | N/A | 5,137.7 | 15,182.1 | 17,206.4 |

901

Performance Formula for Lanes 2 and 1, Cars only

| Platoon Length | ft | TLx | $= (SHN-1) * (SHL + SHC) + SHL + TC$ |
|---|---|---|---|
| Vehicle Density, cars | cpm | VDCx | $= 5,280 / TLx * SHN$ |
| Lene Usage C | cph | LUCx | $= VDCx * Vx$ |

Performance Formula for Lane 3, Cars and Trucks

| Platoon Length Trucks | ft | TLT3 | $= (SHNT-1) * (SHLT + SHCT) + SHLT + TCT$ |
|---|---|---|---|
| Platoon Length Cars | ft | TLC3 | $= (SHNC-1) * (SHLC + SHCC) + SHLC + TCC$ |
| Platoon Length | ft | TL3 | $= TLT3 + TLC3$ |
| Vehicle Density Trucks | cpm | VDT3 | $= 5,280 / TLT3 * SHNT3$ |
| Vehicle Density Cars | cpm | VDC3 | $= 5,280 / TLC3 * SHNC3$ |
| Lane Usage Trucks | cph | LUT3 | $= VDT3 * V3$ |
| Lane Usage Cars | cph | LUC3 | $= VDC3 * V3$ |

FIG. 10

Traffic Flow Performance as Function of Lane Velocities

| | Traffic Velocity on Lanes (mph) | | | | Lane Capacity (Vehicles / hour) | | | | | | |
|---|---|---|---|---|---|---|---|---|---|---|---|
| | Lane 4 | Lane 3 | Lane 2 | Lane 1 | Trucks | Lane 3 Cars | Lane 2 Cars | Lane 1 Cars | Total Cars Lanes 2 & 1 | Total Cars Lanes 3, 2 & 1 | |
| Embodiment 1 | 55 | 65 | 75 | 85 | 2,055 | 5,138 | 15,182 | 17,206 | 32,388 | 37,526 | |
| Embodiment 2 | 60 | 75 | 90 | 105 | 2,357 | 5,893 | 18,218 | 21,255 | 39,473 | 45,366 | |
| Embodiment 3 | 65 | 85 | 105 | 125 | 2,671 | 6,679 | 21,255 | 25,303 | 46,558 | 53,236 | |

901

1001

1002

1003

MULTI-LANE TRAFFIC MANAGEMENT SYSTEM FOR PLATOONS OF AUTONOMOUS VEHICLES

BACKGROUND OF THE INVENTION

Field of the Invention

One or more embodiments of the invention are related to the fields of autonomous vehicles and traffic control systems for these vehicles. More particularly, but not by way of limitation, one or more embodiments of the invention enable a multi-lane traffic management system for platoons of autonomous vehicles.

Description of the Related Art

Freeway congestion is a serious and increasing problem with enormous costs to society and to drivers. Because of the limitations and errors of human drivers, today's traffic configurations tend to break down under elevated traffic loads resulting in excessively long travel times. To address these problems, researchers have proposed organizing autonomous vehicles into fast moving platoons that are completely computer controlled to reduce congestion and improve traffic flow. Government agencies and private industry have conducted road tests with autonomous vehicles organized into single platoons to confirm a flawless performance of autonomous vehicles moving along in platoon-type configurations. However, the existing research and proposals have been limited in scope and have not addressed a complete system to manage flow of autonomous vehicles on roads with multiple lanes, which not only organizes vehicles into platoons but also manages multiple platoons across multiple lanes for optimal traffic flow.

For at least the limitations described above there is a need for a multi-lane traffic management system for platoons of autonomous vehicles.

BRIEF SUMMARY OF THE INVENTION

One or more embodiments described in the specification are related to a multi-lane traffic management system for platoons of autonomous vehicles. Embodiments of the invention may communicate with autonomous vehicles to control their movements in lanes that are managed by the system. Vehicles may be organized into platoons of closely packed, fast moving vehicles within each managed lane.

One or more embodiments may have a traffic controller with a processor and a network interface that is coupled over a network to multiple vehicle controllers. Each vehicle controller may be associated with an autonomous vehicle that is on a road with three or more lanes of traffic moving in the same direction. These lanes may include an unmanaged lane where the autonomous vehicles enter and exit the road, and they may include multiple managed lanes. The traffic controller may be configured to receive or calculate traffic flow parameters. These parameters may include vehicle types, which may include a car type and a truck type. They may also include lane parameters associated with each managed lane. The lane parameters may include allowed vehicle types (which may be a nonempty subset of the vehicle types), a lane vehicle speed, and platoon parameters corresponding to each allowed vehicle type. Lane vehicle speeds may strictly increase as lanes are located further from the unmanaged lane. The platoon parameters for a vehicle type may include a slot length, an inter-slot distance, the number of slots per platoon, and an inter-platoon distance between the back of a platoon and the front of a next platoon of each allowed vehicle type. The traffic controller may also be configured to assign each autonomous vehicle to a managed lane, to a platoon in this managed lane, and to one or more slots in the platoon. The one or more slots may be at the front of all unoccupied slots in the platoon, and they may jointly accommodate the length of the autonomous vehicle. The traffic controller may also be configured to receive vehicle position data via the network from each vehicle controller, and to transmit motion commands over the network to each vehicle controller. The motion commands may include commands to move the autonomous vehicle from the unmanaged lane to its assigned lane, platoon, and one or more slots. They may include commands to maintain the autonomous vehicle in its assigned lane and platoon. When a slot in the platoon in front of the autonomous vehicle becomes available, the commands may include commands to move the autonomous vehicle forward in the platoon to occupy this slot. The commands may also include commands to move the autonomous vehicle from its assigned lane and platoon into the unmanaged lane.

In one or more embodiments, moving the autonomous vehicle from the unmanaged lane to its assigned lane, platoon, and one or more slots may include repeatedly moving the vehicle from its current lane to an adjacent faster lane when the vehicle is aligned with an open slot in a platoon in the adjacent lane, until the vehicle arrives in its assigned lane.

In one or more embodiments moving an autonomous vehicle from its current lane to an adjacent faster lane may include accelerating the vehicle to the lane speed of the adjacent faster lane and shifting it into this adjacent faster lane, further accelerating the vehicle to move it into its assigned one or more slots, and decelerating the vehicle to the lane speed of the adjacent faster lane.

In one or more embodiments the car type may include sedans, vans, limousines, and light trucks. In one or more embodiments the truck type may include semi-trucks.

In one or more embodiments the allowed vehicle types for a managed lane adjacent to the unmanaged lane may include the car type and the truck type; the allowed vehicle types for all other managed lanes may include the car type but may not include the truck type.

In one or more embodiments the difference in lane speeds between adjacent managed lanes may be between 5 mph and 15 mph. In one or more embodiments this difference may be 10 mph.

In one or more embodiments the lane vehicle speed associated with the managed lane adjacent to the unmanaged lane may be 65 mph.

In one or more embodiments the number of slots per platoon may be constant for all managed lanes except for the managed lane adjacent to the unmanaged lane. For example, the number of slots per platoon may be 5 for a platoon associated with the car type on the managed lane adjacent to the unmanaged lane, 2 for a platoon associated with the truck type on the managed lane adjacent to the unmanaged lane, and 8 for a platoon associated with the car type on managed lanes not adjacent to the unmanaged lane.

In one or more embodiments the slot length may be between 20 feet and 30 feet for all platoons associated with the car type, and between 60 feet and 100 feet for all platoons associated with the truck type. For example, the slot length may be 23 feet for car type platoons, and 80 feet for truck type platoons.

In one or more embodiments the inter-slot distance may be between 6 inches and 3 feet for all platoons associated with the car type, and between 3 feet and 10 feet for all platoons associated with the truck type. For example, the inter-slot distance may be 1 foot for car type platoons, and 5 feet for truck type platoons.

In one or more embodiments the inter-platoon distance between the back of a platoon and the front of a next platoon of the truck type may be between 30 feet and 40 feet, and the inter-platoon distance between the back of a platoon and the front of a next platoon of the car type may be between 15 feet and 20 feet.

BRIEF DESCRIPTION OF THE DRAWINGS

The above and other aspects, features and advantages of the invention will be more apparent from the following more particular description thereof, presented in conjunction with the following drawings wherein:

FIG. 8 shows illustrative values for the traffic flow parameters shown in FIG. 7.

FIG. 9 shows calculations of traffic flow performance based on the traffic flow parameter values of FIG. 8.

FIG. 10 shows calculations of traffic flow performance for variations in lane vehicle speeds.

DETAILED DESCRIPTION OF THE INVENTION

A multi-lane traffic management system for platoons of autonomous vehicles will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
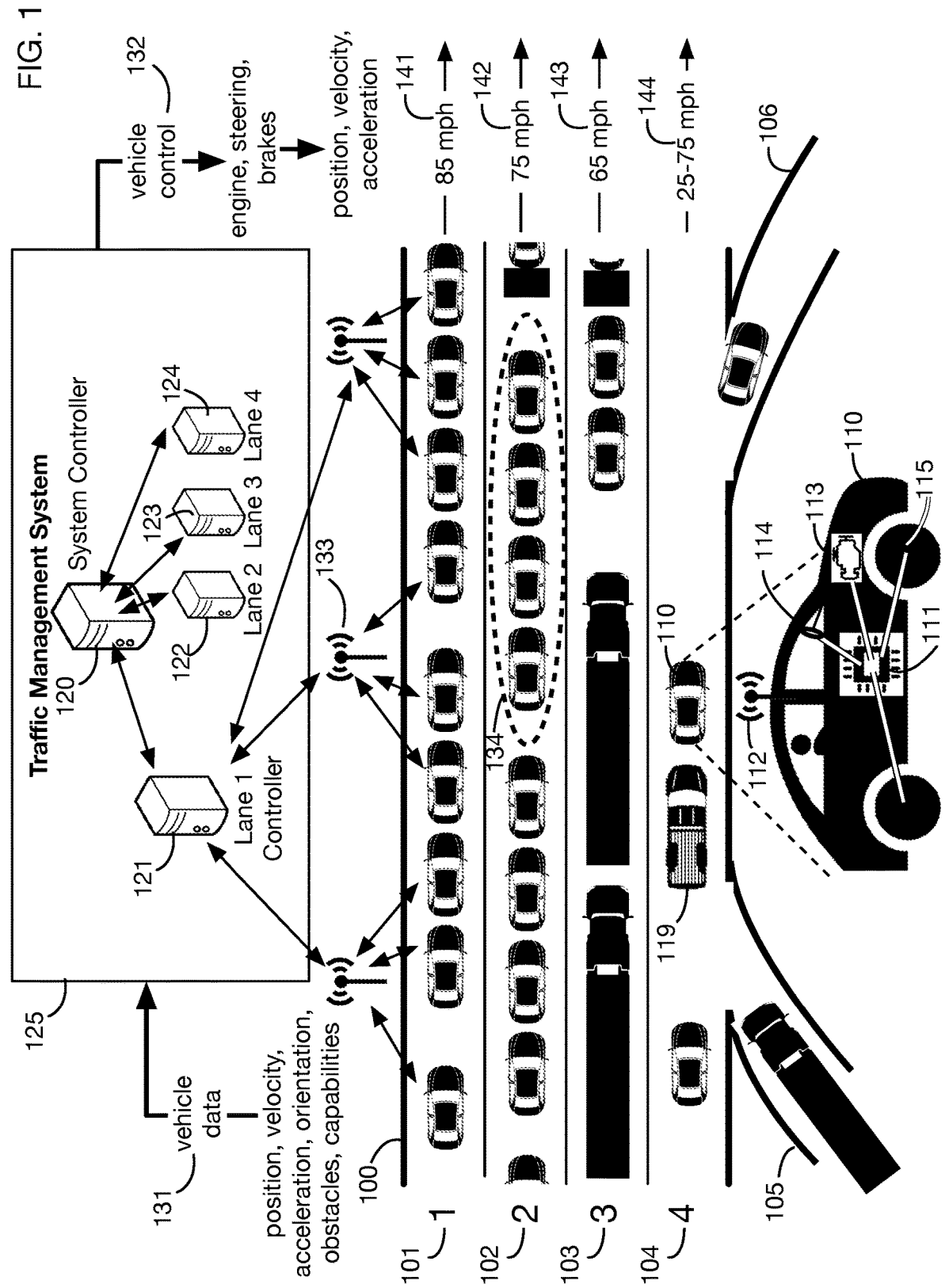
FIG. 1 shows an architectural diagram for an embodiment of a traffic management system that manages vehicle platoons in three lanes reserved for autonomous vehicles.

FIG. 1 shows an architecture diagram of an illustrative embodiment of the invention. Traffic management system 125 manages the flow of traffic on a road 100, which has four lanes 101, 102, 103, and 104 with traffic flowing in the same direction. (The road may also have lanes for traffic flowing in the opposite direction, which may be managed by traffic management system 125 or a similar system for these lanes.) One or more embodiments of the invention may manage traffic flow on road with any number of lanes in each direction. In the embodiment shown in FIG. 1, vehicles enter road 100 via lane 104, which may be connected to entry ramps such as ramp 105 and to exit ramps such as ramp 106. Traffic enters the other lanes 101 through 103 by moving between lanes. One or more embodiments of the invention may manage roads with more complex topologies where traffic may enter or exit from multiple lanes, or where lanes may split, merge, diverge, or converge. In standard US highway terminology, lane 101, which is the far left lane, is referred to a lane number 1, and lanes 102 through 104 are referred to as lanes 2 through 4, respectively.

Traffic management system 125 may have one or more processors that receive data 131 from vehicles (and potentially from other sensors that monitor road 100) and that transmit control commands 132 to vehicles to manage the traffic flow on the lanes of the road. In the illustrative embodiment of FIG. 1, system 125 has processors that are organized hierarchically, with a system controller 120 that manages the overall traffic flow, and individual lane control processors 121 through 124 that control traffic on lanes 101 through 104, respectively. This hierarchical structure is illustrative; one or more embodiments may organize processors and distribute functionality across processors in any desired manner.

Traffic management system 125 reserves lanes 101, 102, and 103 for autonomous vehicles that are fully managed by the system. Lane 104 is unmanaged because it may contain both autonomous vehicles such as vehicle 110 and manually driven vehicles such as vehicle 119, and traffic flow in this lane is not fully controlled by the system. (Although lane 104 is called "unmanaged" in this application, the traffic management system 125 still communicates with some of the vehicles in this lane and may control some of these vehicle's actions, such as transitioning these vehicles to other managed lanes.) Because lanes 101 through 103 are fully managed by the traffic management system, the system can organize vehicles in these lanes into platoons of closely spaced, rapidly moving vehicles to achieve extremely high rates of traffic flow, as described below. For example, platoon 134 in lane 102 consists of four vehicles that are closely spaced together and that move at the same speed. All of the vehicles in the managed lanes are placed into platoons. Within each managed lane, all of the vehicles move at the same speed (apart from small adjustments to maintain relative positions within the platoon, and apart from lane changes). Moreover, the managed lane speeds are structured so that they strictly increase for managed lanes as they are further away from unmanaged lane 104. This increasing lane speed provides benefits in simplifying transitions of autonomous vehicles between lanes, as described below. In the illustrative embodiment of FIG. 1, managed lane 103 has lane vehicle speed 143; managed lane 102 has lane vehicle speed 142 that is 10 mph faster than speed 143; and managed lane 101 has lane vehicle speed 141 that is 10 mph faster than speed 142. These speeds and speed differences are illustrative; one or more embodiments of the traffic management system may manage vehicles to have any desired lane speeds that are uniform within a lane and that increase as lanes are further from the unmanaged lane. Speeds 144 of vehicles in the unmanaged lane may vary, because vehicles in this lane are not organized into uniform platoons by the traffic management system 125.

The processor or processors of traffic management system 125 control autonomous vehicles on road 100 by communicating over network connections to processors in the vehicles. For example, autonomous vehicles in lane 101 may communicate to wireless transceivers such as transceiver 133, which is connected by a network link to processor 121 (and thus to system controller 120 as well). Illustrative autonomous vehicle 110 may have for example one or more processors 111, and a network interface 112 for communication with the traffic management system. Vehicle processor 111 may be linked for example the engine 113, steering 114, brakes 115, and to any other actuators in the vehicle; traffic management system 125 may transmit control commands 132 to the vehicle processor to affect any of these actuators, thereby controlling the vehicle's position, velocity, and acceleration. Vehicle sensors linked to vehicle processor 111 (which may be augmented for example with sensors in or near the road) may measure data such as the vehicle's position, orientation, velocity, acceleration, and the status of any of the vehicle's subsystems. Data 131 transmitted to any of the processors of the vehicle management system 125 may include any sensor data as well as information on each vehicle's capabilities, which may for example indicate the vehicle's self-driving features and performance parameters such as potential acceleration, turning radius, weight, fuel consumption, and braking power. Traffic management system 125 may use any of this information to optimize traffic flow.

In one or more embodiments, the processors of traffic management system 125 and the processors of autonomous vehicles such as vehicle processor 111 may collectively manage traffic flow by distributing computations and control in any desired manner; for example, once a vehicle is assigned to a lane and a platoon by the traffic management system, the vehicle processor may adjust vehicle speed to keep the vehicle in its assigned relative position within a platoon.

Figure 2:
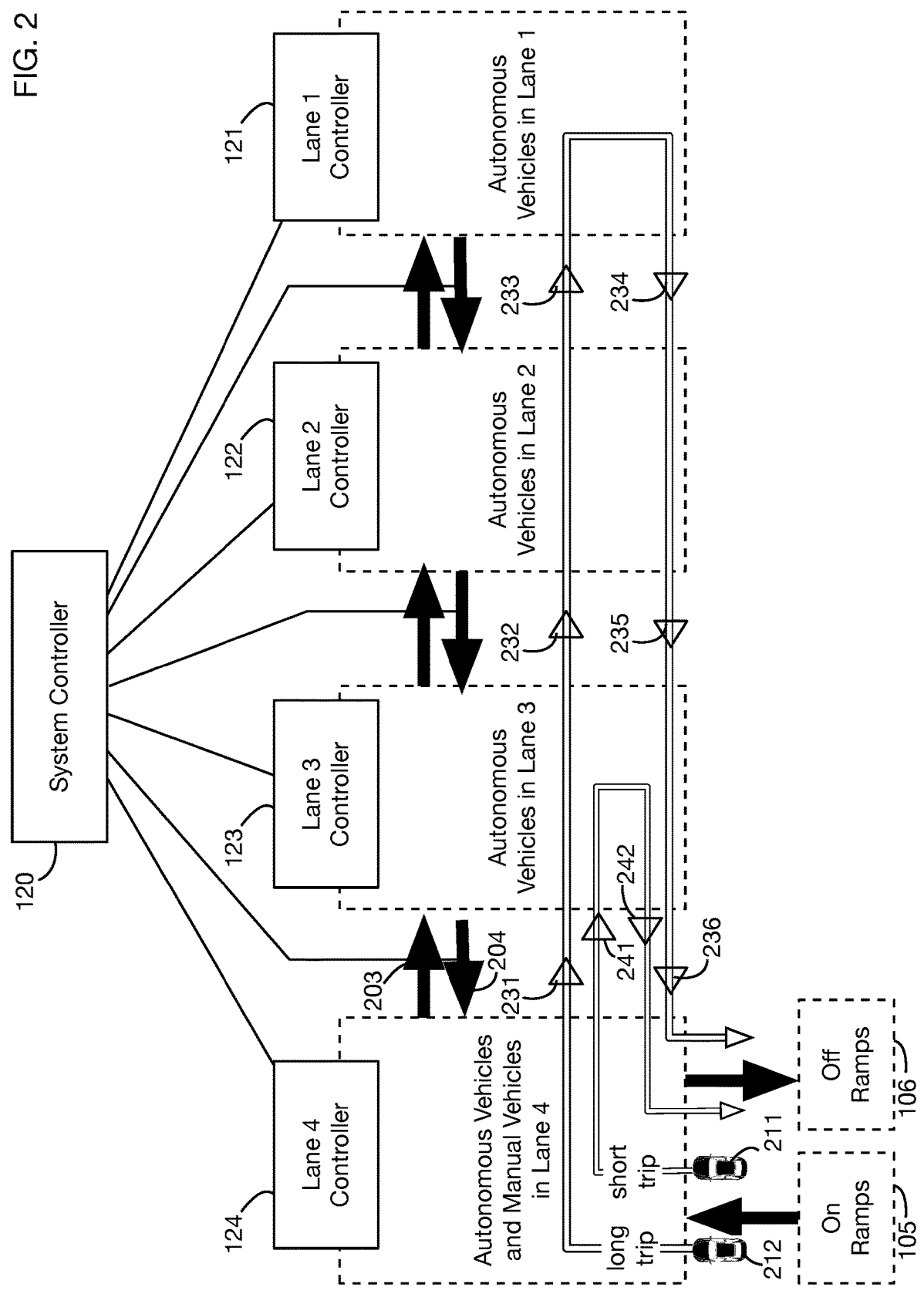
FIG. 2 shows illustrative lane transitions managed by the system of FIG. 1.

Traffic management system 125 manages the flow of vehicles on road 100, and in particular it manages the transitions of vehicles onto and off of lanes. Lane transition management is illustrated in FIG. 2 for the lanes of road 100. In this embodiment, each lane controller manages the flow of vehicles within the lane, subject to the traffic flow parameters set by system control controller 120. System controller 120 manages lane transitions, such as a lane change 203 to move a vehicle from lane 4 (lane 104 in FIG. 1) to lane 3 (lane 103 in FIG. 1), and a lane change 204 from lane 3 to lane 4. Lane changes between other lanes are similarly managed. System controller 120 determines when to move vehicles between lanes, and it coordinates the control of vehicles to effect this lane change. Since lanes speeds are increasing as lanes are further from lane 4 (the unmanaged lane), the traffic management system generally favors moving vehicles into the fastest available lane in order to maximize traffic flow. However, for vehicles that take shorter trips on road 100, there may not be enough time to move these vehicles into the fastest lane; moreover, reserving the fastest lanes for longer trips maximizes the overall throughput of the road. Therefore the traffic management system in one or more embodiments may communicate with vehicles when they enter the road to determine when each vehicle intends to exit the road, and it may plan lane assignments accordingly. FIG. 2 illustrates two scenarios. Vehicle 211 enters lane 4 of road 100 and indicates that it will exit shortly thereafter. Therefore, the traffic management system performs lane change 241 to move vehicle 211 to lane 3, and then as the vehicle's planned exit approaches it performs lane change 242 to move the vehicle back to lane 4. Vehicle 212 enters lane 4 and indicates that it will make a long trip on the road before exiting. Therefore, the traffic management system performs successive lane changes 231, 232, 233 to move the vehicle to lane 1 (the fastest lane) for the majority of the trip; in advance of the vehicle's planned exit, the system then performs successive lane changes 234, 235, 236 to move the vehicle back to lane 4 for exit. The traffic management system may allocate vehicles to lanes using any desired criteria and algorithms, and may take into account factors such as length of trip for each vehicle, overall capacity and occupancy of each lane, and the time required for lane changes. In one or more embodiments the system may purposely leave open slots in some platoons in intermediate lanes (such as lanes 2 and 3) to provide the ability for vehicles to move from the unmanaged lane to the fastest lane (lane 1). For example, in one or more embodiments, in lane 2 one slot per platoon may be kept open to allow vehicles to pass through lane 2 when transitioning between lane 1 and lane 3, and in lane 3 two slots per platoon may be kept open to allow vehicles to pass through lane 3 when transitioning between lane 4 and lane 2. With 8 slots per platoon, this approach achieves 87% capacity utilization in lane 2 (with 7 of 8 slots occupied) and 75% capacity utilization in lane 3 (with 6 of 8 slots occupied); lane 1 achieves 100% capacity utilization since it may be completely filled with vehicles.

Figure 3:
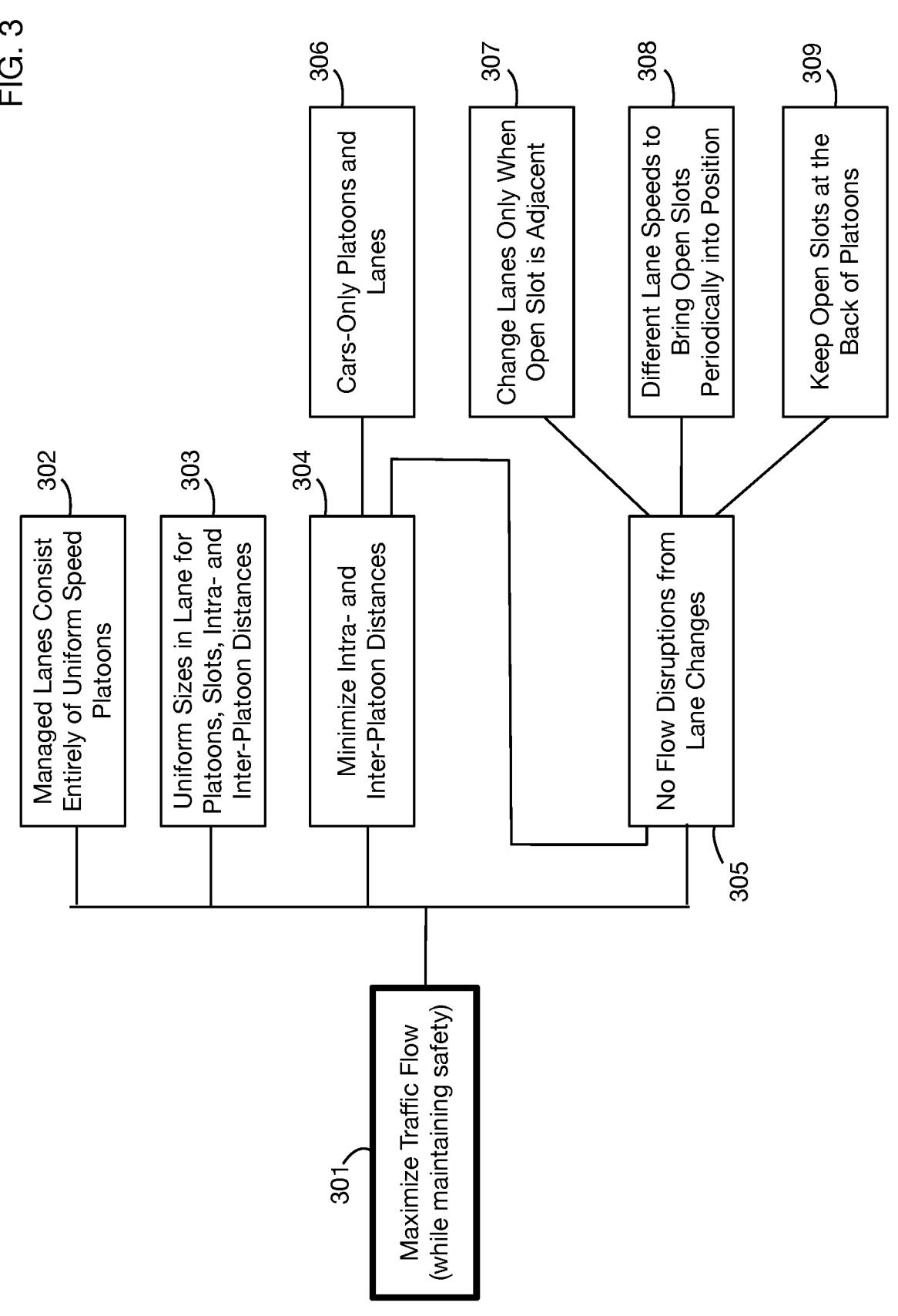
FIG. 3 shows innovative features of a traffic management system that contribute to the objective of maximizing traffic flow.

One or more embodiments of the invention may use any or all of several innovative traffic management features to manage the flow of traffic on managed lanes and to manage lane transitions. Illustrative features are shown in FIG. 3 and are illustrated in subsequent figures. An overall objective 301 of the traffic management system may be for example to maximize traffic flow, subject to constraints that ensure safety. Traffic flow may be measured for example as the number of vehicles passing through a position in the road per unit of time. Traffic management feature 302 is to organize vehicles in managed lanes into platoons that all travel with the same speed within each lane. The uniform speed within a lane allows vehicles to travel at much higher speeds than those of existing highways with manually driven vehicles. Feature 303 is to use fixed sizes within each managed lane for traffic parameters such as platoon size, the size of each "slot" in a platoon (illustrated below in FIG. 4), and the lengths of spaces between slots and between platoons. This fixed structure greatly simplifies traffic management and minimizes disruption to steady traffic flow. Feature 304 is to minimize the distances between slots in a platoon and between platoons. Some spacing is necessary to accommodate small fluctuations in vehicle positions and to handle lane changes (as described below), but this spacing should be minimized to pack vehicles as closely together as possible to maximize traffic flow.

Feature 305 is to eliminate flow disruptions from lane changes, which are a major source of traffic disruptions in roads with manually driven vehicles. To eliminate lane change disruptions, one or more embodiments may include several innovative features to simplify and streamline lane changes without impacting the flow of vehicles. Feature 308 is to use different lane speeds in different managed lanes. Because lane speeds differ, the relative position changes over time between a vehicle in one lane and platoons in an adjacent lane. Therefore a lane change for a vehicle can be performed using the mechanism 307 of waiting until the vehicle is adjacent to an open slot in a platoon in the target lane. Feature 309 ensures that open slots are at the back of a platoon, so the vehicle making the lane change can move into an open slot without impacting other vehicles in the platoon. In combination these features 307, 308, and 309 ensure that the vehicle can move into the adjacent lane without impacting the flow of any other vehicles.

Eliminating disruptions from lane changes also contributes to objective 304 of minimizing intra-platoon and inter-platoon distances. As described below, some inter-platoon space is needed for lane changes to accommodate back-slipping during lane changes, but this need is minimized using the lane-change strategies described above. Another feature that contributes to reduced intra-platoon and inter-platoon spacing is feature 306 of separating cars and trucks into different platoons, and allocating some of the managed lanes exclusively to cars. Since trucks typically require larger spacing (for example due to their longer braking distances), cars can be packed more closely together when trucks are placed into separate platoons and separate lanes.

Figure 4:
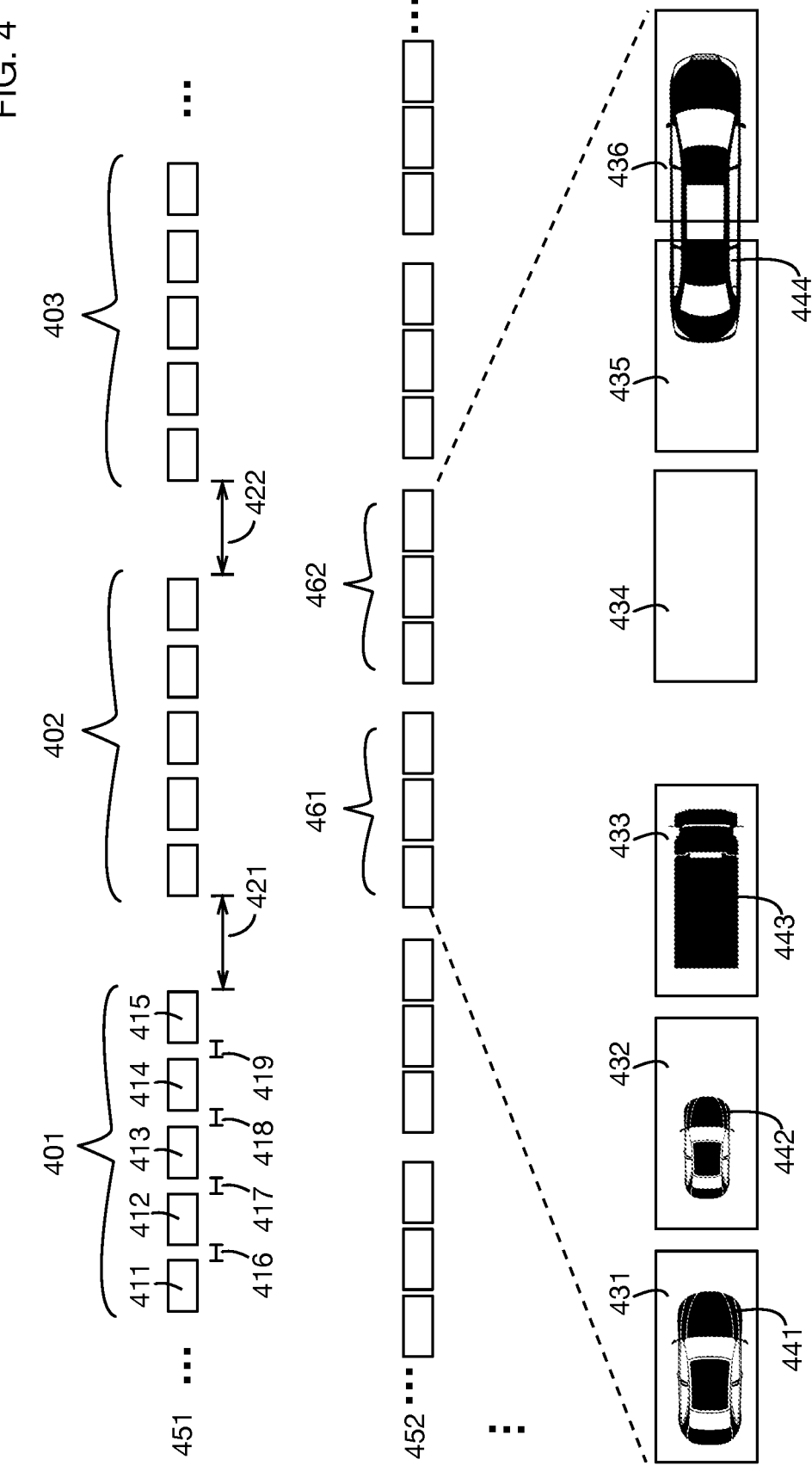
FIG. 4 shows platoon organization in an illustrative embodiment of the invention for two illustrative managed lanes; platoons are fixed sized and regularly spaced within each lane, with fixed sized slots for vehicles that are independent of vehicle length.

FIG. 4 illustrates the basic structure of managed lanes in one or more embodiments of the invention for two illustrative managed lanes 451 and 452. As described above with respect to feature 302, vehicles in managed lanes are organized into uniform speed platoons (within each lane); and as described with respect to feature 303, within each lane the platoons have uniform sizes, with uniform slot lengths and uniform intra-platoon and inter-platoon distances. Each platoon consists of a fixed number of fixed length "slots" into which vehicles may be placed. In illustrative lane 451, platoons 401, 402, and 403 each have 5 slots per platoon. In platoon 401, slots 411 through 415 all have the same length, and inter-slot spaces 416, 417, 418, and 419 all have the same length. Inter-platoon spacing 421 between platoons 401 and 402 is the same is inter-platoon spacing 422 between platoons 402 and 403.

Illustrative lane 452 is also organized into fixed-sized platoons with uniform spacing, although the specific sizes and spacings differ from those of lane 451. Platoons all have 3 slots per platoon, and intra-platoon and inter-platoon spacing is smaller than that of lane 451. A closeup view of platoons 461 and 462 shows how vehicles are assigned to slots within the platoon. Vehicles may be of various lengths, but slots are of uniform size. For example, vehicle 443 is longer than vehicle 441, which is in turn longer than vehicle 442; these three vehicles are each placed in slots 433, 431, and 432, respectively, with equal slot sizes. In platoon 462, slot 434 is empty, and is at the back of the platoon. The traffic management system may manage vehicles to always keep open slots at the back of platoons. Vehicle 444, which may be for example a limousine or other very long vehicle, is longer than the size of each slot of platoon 462; therefore, the system allocates two slots 435 and 436 for this vehicle. In general, a vehicle may be assigned to one or more slots, with the number of slots selected to accommodate the vehicle's length.

Figure 5:
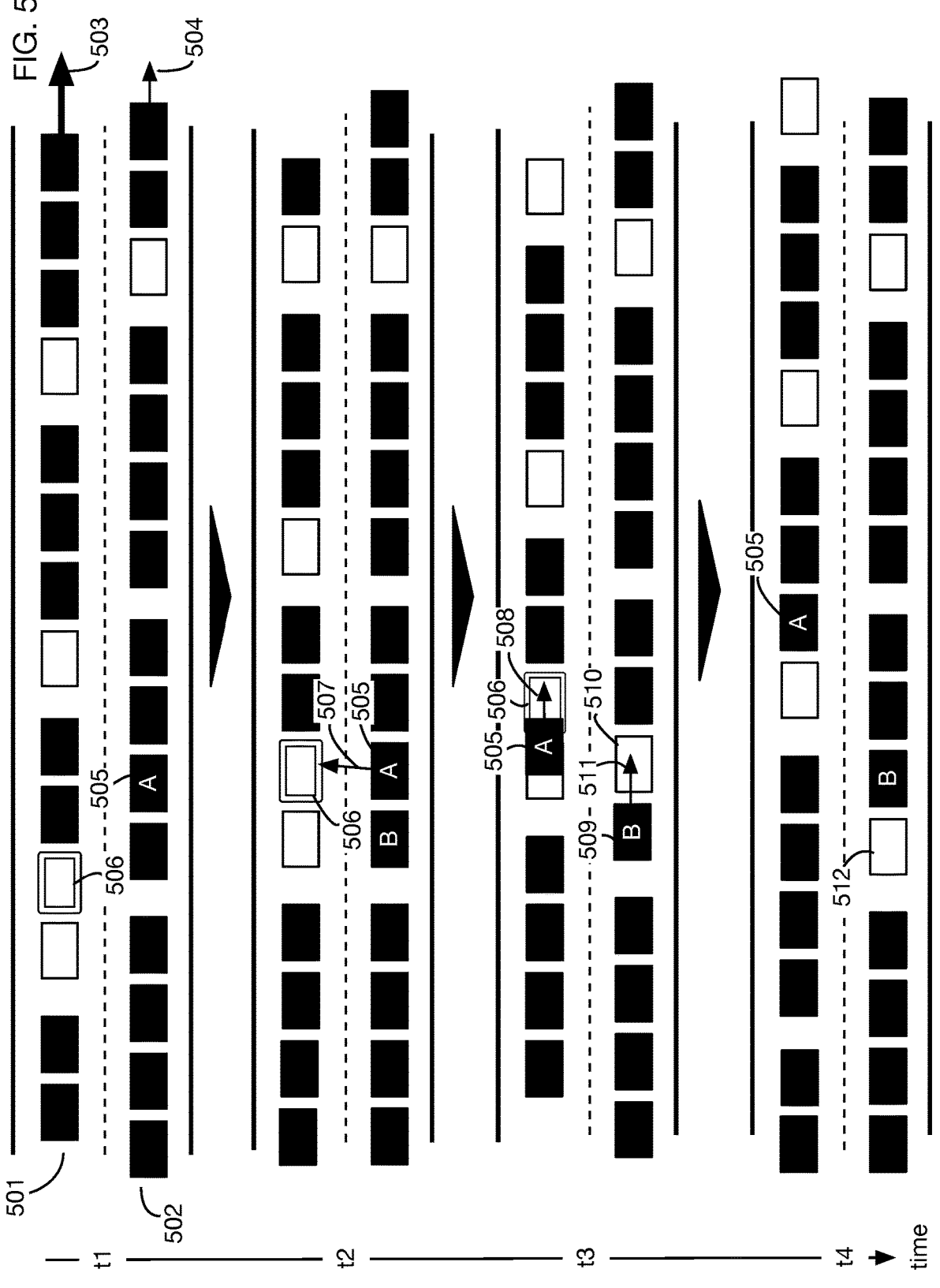
FIG. 5 shows a time sequence of lane configurations that illustrate moving a vehicle from a platoon in a slower lane to an open slot in a platoon in an adjacent faster lane.
Figure 6:
FIG. 6 shows a velocity curve for the vehicle lane transition of FIG. 5, and velocity curves for other lane transitions for cars and trucks.

FIGS. 5 and 6 illustrate a lane change procedure that may be used in one or more embodiments. As described above with respect to FIG. 3, a basic strategy for lane changes that may be used is to wait until an open slot is adjacent to the vehicle making the lane change. FIG. 5 shows snapshots of two lanes 501 and 502 at four successive times t1, t2, t3, and t4. Lane 501 has associated vehicle speed 503, which is greater than the vehicle speed 504 in lane 502. In this illustrative example, platoons in both lanes 501 and 502 consist of four slots each. Occupied slots are shown in black, and open (unoccupied) slots are shown in white. The snapshots indicate the relative position of slots in the two lanes, with the slots in lane 502 shown as stationary. (In fact all slots in both lanes move forward over time, but only the relative position is relevant for this discussion of lane change dynamics.) At time t1, vehicle 505 in lane 502 is waiting to move to faster lane 501. The next open slot 506 in lane 501 is behind the position of vehicle 505, so the vehicle must wait until the faster movement of lane 501 aligns the slot 506 with the vehicle. This alignment occurs at time t2, and vehicle 505 begins a shift 507 towards slot 506 in lane 501. This shift requires vehicle 505 to both accelerate (to catch up with slot 506 as it moves away from the vehicle's position) and to move laterally between lanes. At time t3, vehicle 505 has moved into lane 501 and has accelerated to the speed 503 of traffic in that lane. However, the vehicle has slipped backwards relative to slot 506 because it could not accelerate instantaneously to speed 503. Therefore, an additional relative movement 508, which requires temporary acceleration above speed 503, is needed for vehicle 505 to occupy slot 506. At the same time, a slot 510 in lane 502 is now unoccupied since vehicle 505 has moved out of the slot. In this embodiment the traffic management system organizes platoons to keep all open slots at the end of each platoon. To achieve this objective, vehicle 509 in lane 502 make a relative move 511 forward into slot 510. At time t4, the motions of vehicles 505 and 509 are complete; vehicle 505 is in its new slot in lane 501, and previously open slot 511 has been occupied by vehicle 509, leaving open slot 512 at the back of the platoon in lane 502.

FIG. 6 shows a quantitative example of the lane change procedure illustrated in FIG. 5. The graphs show the speed over time of illustrative vehicles as they perform lane changes: graph 621 shows a speed curve for a car moving from a slower lane to a faster lane; graph 622 shows a speed curve for a truck moving from a slower lane to a faster lane; graph 623 shows a speed curve for a car moving from a faster lane to a slower lane; and graph 624 shows a speed curve for a truck moving from a faster lane to a slower lane. Speeds are shown as an offset to the lane speed of the slower lane. The illustrative truck is presumed to accelerate and decelerate more slowly than the illustrative car. The difference 600 in vehicle speeds between the two lanes is set to 10 mph for illustration; this speed difference is illustrative, and a similar analysis may be applied for lanes with any speed difference. Curve 621 may for example correspond to the sequence shown in FIG. 5 for a car moving from a slower lane 502 to a faster lane 501. During time period 601, the car waits for the open slot in the faster lane to move into the position adjacent to the car. During time period 602, the car accelerates and shifts over to the faster lane, reaching final speed offset 600; this illustrative car is presumed to achieve this acceleration over a 2 second time period 602. As shown in FIG. 5, at time t3 the car will have slipped backwards relative to the open slot in the faster lane, so additional acceleration 613*a* is then required, followed by deceleration 613*b*, to move the car into its final position at time t4. Most existing cars can achieve acceleration of 10 mph and can also shift lanes all within 2 seconds. For example, at 70 mph a vehicle progresses by 206 feet over 2 seconds; with an average direction shift by 2.75 degrees, a car can accomplish a 12.5-foot side shift within 2 seconds. For acceleration, emerging electric vehicles, such as a Tesla® for example, can accelerate even faster; for example, some Tesla® cars accelerate from 0 mph to 60 mph in 3.6 seconds, which is 0.6 seconds for a 10-mph increment (since one can assume linear acceleration for electric motors). The 2 second time period is therefore a conservative estimate of the amount of time needed for a car to accomplish the combined acceleration and lane shift.

Figure 7:
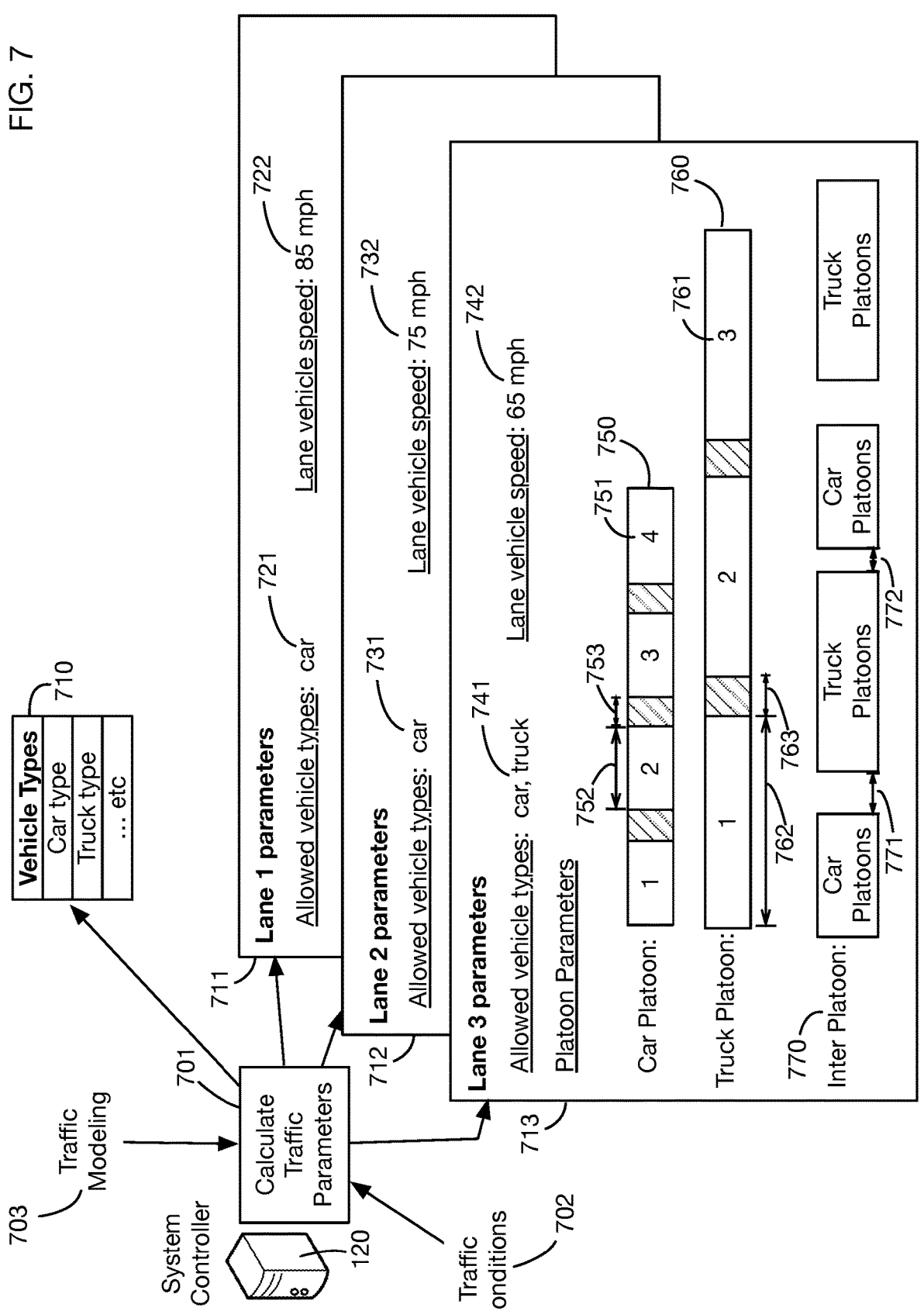
FIG. 7 shows illustrative traffic flow parameters that are calculated by or input into an embodiment of a traffic management system.
Figure 11:
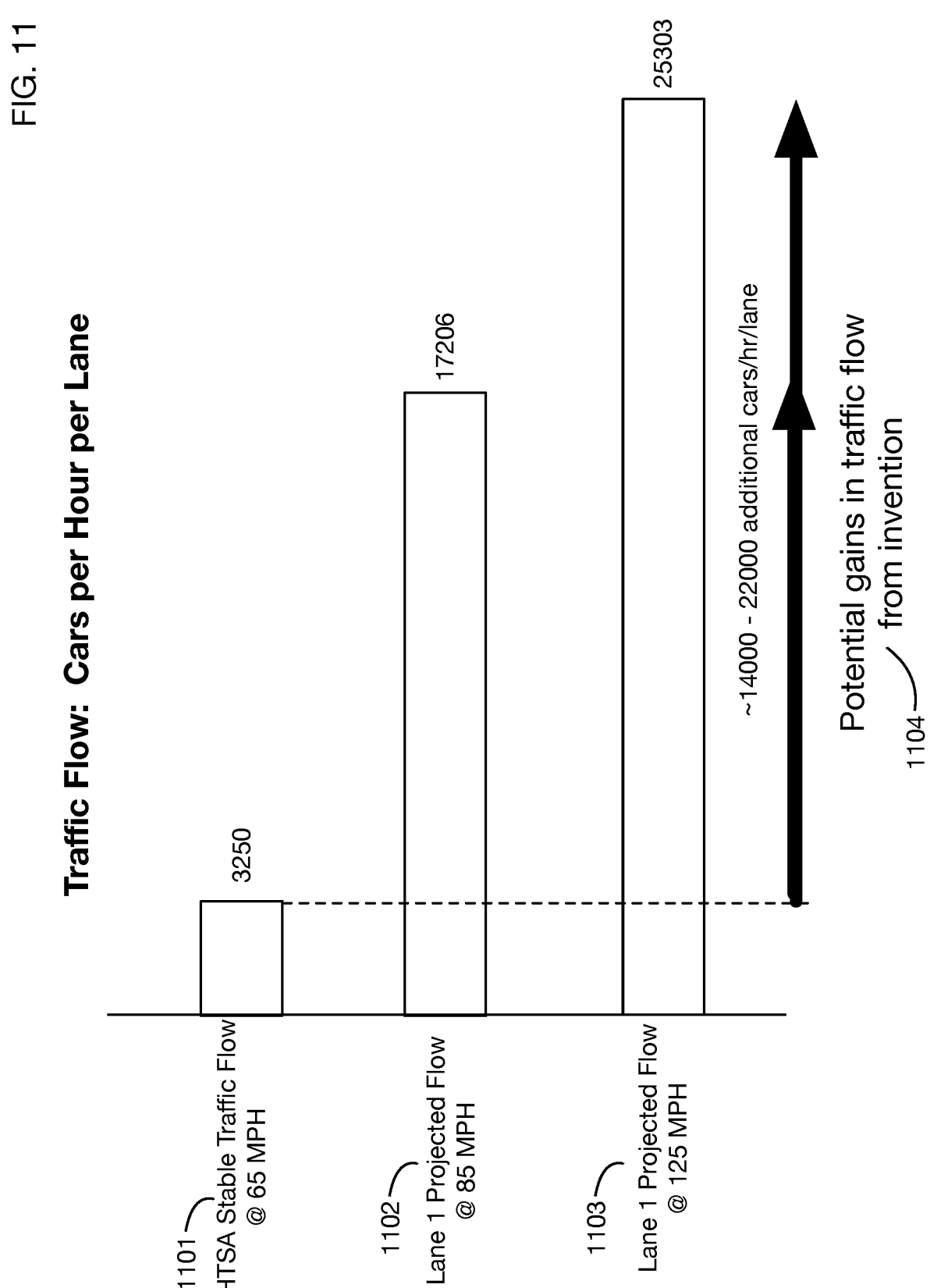
FIG. 11 compares traffic flow performance for illustrative embodiments of the invention to typical stable traffic flows for current freeways.

FIG. 7 shows illustrative traffic flow parameters that may be calculated by or used by traffic management system 125. In one or more embodiments the system controller 120 may perform calculations 701 to determine values for several parameters that affect the flow of traffic on the managed lanes of a road. This calculation 701 may depend for example on current traffic conditions 702, and on modeling 703 that may be made for the effect of various parameters on traffic flow. Traffic parameters may be updated at any desired interval. In one or more embodiments the system may obtain traffic parameters from other traffic modeling systems or may obtain stored parameters that have been calculated for various scenarios.

Illustrative parameters include a set 710 of vehicle types that are used to classify each vehicle managed by the traffic flow system. The system may manage different vehicle types differently as needed or desired. Vehicle types may be based on any vehicle characteristics, such as for example vehicle lengths, weights, or speeds, accelerations. The illustrative approach shown in FIG. 7 is to separate vehicles into a "car" type and a "truck" type, although one or more embodiments may use additional or different vehicle types. The car vehicle type may for example include sedans, limousines, vans, and light trucks. The "truck" vehicle type may for example include semi-trucks and other vehicles that are longer than two slot lengths (as described below). an association 710 between each managed lane and the types of vehicles that are allowed on that lane.

Traffic parameters calculated by process 701 may also include lane parameters for each managed lane. FIG. 7 shows parameters 711 for lane 1, parameters 712 for lane 2, and parameters 713 for lane 3, for an illustrative road with 4 lanes of which lanes 1, 2, and 3 are managed lanes. Each lane may have different parameters, although in some embodiments some of the parameters may be the same across some lanes. Lane parameters may include the set of vehicle types allowed on the lane, since in some embodiments certain lanes may be restricted to certain vehicle types. In the example of FIG. 7, lane vehicle types 721 for lane 1 is cars only, lane vehicle types 731 for lane 2 is cars only, and lane vehicle types 741 for lane 3 is cars and trucks. In general, the lane vehicle types for a lane may be any nonempty subset of the set of vehicle types 710.

Lane parameters may also include the lane vehicle speed, which generally increases as lanes are further from the unmanaged lane. In the example of FIG. 7 the lane vehicle speed 722 for lane 1 is larger than the lane vehicle speed 732 for lane 2, which is larger than the lane vehicle speed 742 for lane 3.

Lane parameters may also include platoon parameters that describe the structure of platoons for each allowed vehicle type in the lane. Platoon parameters for a specific vehicle type in a specific managed lane may include the number of slots in the platoon, the length of each slot, and the spacing between slots. For example, for lane 3, car platoon parameters 750 include the number of car slots 751, the length 752 of a car slot, and the spacing 753 between car slots; and truck platoon parameters 760 include the number of truck slots 761, the length 762 of a truck slot, and the spacing 763 between truck slots. Platoon parameters may also include the distances 770 between platoons. Inter-platoon distances may depend on the type or types of vehicles in the two platoons. For example, the distance 771 between the back of a truck platoon and the front of the next car platoon may be different from the distance 772 between the back of a car platoon and the front of the next truck platoon. For lane parameters 711 and 712, inter-platoon distances will be uniform since these lanes allow only cars.

FIG. 8 gives illustrative values for the traffic flow parameters shown in FIG. 7. (The term "space holder" is used in this table for a slot.) These values may differ in different embodiments of the invention and may be changed over time based on traffic conditions or traffic flow objectives. Parameter names 801 are associated with each parameter (with the "x" suffix indicating that each parameter depends on the lane number x), for use in the calculations shown in FIG. 9. The clearance parameters 802 and 803 are the inter-platoon spacings at the back of a platoon of each type. These values may for example be calculated based on the extent to which a car or a truck slips backwards as it makes a lane change from a slower to a faster lane, as shown in FIGS. 5 and 6; the values 802 and 803 assume car and truck speed profiles as shown in FIG. 6, with an additional allowance of 4 feet behind car platoons and 8 feet behind truck platoons.

FIG. 9 shows calculations of traffic flow performance (as number of vehicles per hour) 901 based on the traffic flow parameters of FIG. 8. FIG. 10 shows a sensitivity analysis for traffic flow performance as a function of lane vehicle speeds. The first embodiment 1001 corresponds to the traffic flow parameters of FIG. 8 and the performance calculations for flow rates 901 in FIG. 9. The second and third embodiments 1002 and 1003 show the effect of changing the lane speed increment between adjacent lanes to 15 mph and 20 mph, respectively.

FIG. 10 compares projected traffic flow performance of the embodiments 1001 and 1003 to typical traffic flow achieved in existing freeways. Flow rate 1101 is a calculation of a traffic flow rate per lane that is "stable" at 65 mph, from research by the NHTSA (National Highway Traffic Safety Administration); higher flow rates are unstable because they lead to accidents or traffic jams, which reduce flow rates below the stable rate. Flow rates 1102 and 1103 show projected flow on lane 1 from embodiments 1001 and 1003, respectively. These calculations illustrate the enormous gains 1104 possible from applying embodiments of the invention to traffic management.

While the invention herein disclosed has been described by means of specific embodiments and applications thereof, numerous modifications and variations could be made thereto by those skilled in the art without departing from the scope of the invention set forth in the claims.

What is claimed is:

1. A multi-lane traffic management system for platoons of autonomous vehicles, comprising:

a traffic controller comprising
a system control processor;
at least one individual lane control processor;
a transceiver; and
a network interface coupled over a network to a multiplicity of vehicle controllers associated with a multiplicity of autonomous vehicles corresponding therewith on a road comprising three or more lanes of traffic moving in a same direction,
wherein said three or more lanes comprise
an unmanaged lane where said multiplicity of autonomous vehicles enter or exit said road; and
a plurality of managed lanes that are fully managed by said traffic controller, wherein said plurality of managed lanes are reserved by said traffic controller for said multiplicity of autonomous vehicles, wherein said plurality of managed lanes are structured via said traffic controller such that lane speeds of the plurality of managed lanes are strictly increased via said traffic controller as the plurality of managed lanes are further away from the unmanaged lane;

wherein said transceiver is connected to said multiplicity of autonomous vehicles and further connected to said system control processor and said at least one individual lane control processor via a network link;

wherein said traffic controller, via said system control processor communicating over a network connection via said network link, performs calculations of traffic flow parameters to determine values that affect a flow of traffic on the plurality of managed lanes, wherein said calculations are performed dependent on current traffic conditions and on a traffic modeling, wherein said traffic flow parameters are calculated as a number of vehicles passing through a position in the road per unit of time, wherein each individual lane control processor manages a flow of vehicles within a respective lane, subject to the traffic flow parameters set by the system control processor, and wherein said traffic flow parameters comprising vehicle types comprising a car type; and a truck type; and lane parameters associated with each lane of said plurality of managed lanes, wherein said lane parameters comprise allowed vehicle types comprising a non-empty subset of said vehicle types; a lane vehicle speed, wherein lane vehicle speeds strictly increase as lanes are located further from said unmanaged lane; and platoon parameters corresponding to each allowed vehicle type, comprising a slot length; an inter-slot distance; a number of slots per platoon; and an inter-platoon distance between a back of a platoon and a front of a next platoon of each allowed vehicle type;

communicates with each autonomous vehicle of said multiplicity of autonomous vehicles when said each autonomous vehicle enters the road to receive data, wherein said data comprises an intent to exit the road, and therefrom determine, from said data that is received, when said each autonomous vehicle intends to exit the road, organizes said multiplicity of autonomous vehicles in said plurality of managed lanes into platoons that all travel with a same speed within said each lane, such that autonomous vehicles of said multiplicity of autonomous vehicles in said each lane are organized into uniform speed platoons, such that within each managed lane of the plurality of managed lanes, all platoons travel at a uniform speed;

uses fixed-size platoons, wherein each platoon of said platoons comprises a predefined number of equally sized slots and fixed inter-slot and inter-platoon distances;

enables lane changes only when an open slot in an adjacent faster lane is aligned with said each autonomous vehicle that intends to exit the road;

maintains all open slots at the back of said each platoon such that the each autonomous vehicle changing lanes moves into said open slot without impacting other autonomous vehicles in the each platoon;

assigns said multiplicity of autonomous vehicles to one or more slots of said open slots based on a length of said each autonomous vehicle, such that longer vehicles of said multiplicity of autonomous vehicles are allocated multiple consecutive slots of said open slots;

configures said plurality of managed lanes such that lane speeds increase in increments as distance from the unmanaged lane increases;

assigns said each autonomous vehicle of said multiplicity of autonomous vehicles at least using said data that is received, via an algorithm, to a lane of said plurality of managed lanes;

a platoon of said platoons in said lane; and one or more slots of said equally sized slots with said fixed inter-slot and inter-platoon distances in said platoon, wherein said one or more slots are at the front of all unoccupied slots in said platoon; and said one or more slots jointly accommodate a length of said each autonomous vehicle, such that said assign is dependent at least on said data that is received, said data further comprising an intended length of trip from said each autonomous vehicle that indicates when said each autonomous vehicle intends to exit, overall capacity and occupancy of said each lane, and a time required for lane changes between said plurality of managed lanes;

minimizes distances between said equally sized slots of said each platoon and between said platoons, receives vehicle data via said network from each vehicle controller of said multiplicity of vehicle controllers, wherein said vehicle data comprises information on capabilities of said each autonomous vehicle, said capabilities indicating self-driving features and performance parameters of said each autonomous vehicle and, one or more of position of said each autonomous vehicle, orientation of said each autonomous vehicle, velocity of said each autonomous vehicle, acceleration of said each autonomous vehicle, status of a subsystem of said each autonomous vehicle; and, transmits motion commands over said network to each vehicle controller associated with said each autonomous vehicle to command said each vehicle controller to affect one or more actuators associated with said each autonomous vehicle, wherein said motion commands are transmitted based on said data and said vehicle data, and comprise move said each autonomous vehicle from said unmanaged lane to its assigned lane, platoon, and one or more slots;

maintain said each autonomous vehicle in its assigned lane and platoon;

when a slot in said platoon in front of said each autonomous vehicle becomes open, move said each autonomous vehicle forward in said platoon to occupy said slot; and move said each autonomous vehicle from its assigned lane and platoon into said unmanaged lane.

2. The multi-lane traffic management system for platoons of autonomous vehicles of claim 1, wherein said move said each autonomous vehicle from said unmanaged lane to its assigned lane, platoon, and one or more slots comprises repeatedly move said each autonomous vehicle from its current lane to an adjacent faster lane when said each autonomous vehicle is aligned with an open slot in a platoon in said adjacent faster lane, until said each autonomous vehicle arrives in said assigned lane.

3. The multi-lane traffic management system for platoons of autonomous vehicles of claim 2, wherein said move said each autonomous vehicle from its current lane to an adjacent faster lane comprises accelerate said each autonomous vehicle to a lane speed of said adjacent faster lane and shift said each autonomous vehicle into said adjacent faster lane;

further accelerate said each autonomous vehicle to move said each autonomous vehicle into its assigned one or more slots in said adjacent faster lane; and, decelerate said each autonomous vehicle to said lane speed of said adjacent faster lane.

4. The multi-lane traffic management system for platoons of autonomous vehicles of claim 1, wherein said car type comprises sedans, vans, limousines, and light trucks; and said truck type comprises semi-trucks.

5. The multi-lane traffic management system for platoons of autonomous vehicles of claim 1, wherein said allowed vehicle types of a managed lane adjacent to said unmanaged lane comprises said car type and said truck type; and, said allowed vehicle types of all managed lanes not adjacent to said unmanaged lane comprises said car type and does not comprise said truck type.

6. The multi-lane traffic management system for platoons of autonomous vehicles of claim 1, wherein said traffic controller uses different lane speeds in each managed lane of said plurality of managed lanes to eliminate lane change disruptions, such that a difference in lane vehicle speeds between adjacent managed lanes is between 5 mph and 15 mph.

7. The multi-lane traffic management system for platoons of autonomous vehicles of claim 6, wherein said difference in lane vehicle speeds between adjacent managed lanes is 10 mph.

8. The multi-lane traffic management system for platoons of autonomous vehicles of claim 7, wherein said lane vehicle speed associated with a managed lane adjacent to said unmanaged lane is 65 mph.

9. The multi-lane traffic management system for platoons of autonomous vehicles of claim 1, wherein said number of slots per platoon that is calculated is constant for all managed lanes except a managed lane adjacent to said unmanaged lane.

10. The multi-lane traffic management system for platoons of autonomous vehicles of claim 9, wherein said number of slots per platoon that is calculated comprises 5 for a platoon associated with said car type on a managed lane adjacent to said unmanaged lane;

2 for a platoon associated with said truck type on a managed lane adjacent to said unmanaged lane; and, 8 for a platoon associated with said car type on a managed lane not adjacent to said unmanaged lane.

11. The multi-lane traffic management system for platoons of autonomous vehicles of claim 1, wherein said slot length that is calculated is between 20 feet and 30 feet for all platoons associated with said car type; and, between 60 feet and 100 feet for all platoons associated with said truck type.

12. The multi-lane traffic management system for platoons of autonomous vehicles of claim 11, wherein said slot length that is calculated is 23 feet for all platoons associated with said car type; and, 80 feet for all platoons associated with said truck type.

13. The multi-lane traffic management system for platoons of autonomous vehicles of claim 1, wherein said inter-slot distance that is calculated is between 6 inches and 3 feet for all platoons associated with said car type; and, between 3 feet and 10 feet for all platoons associated with said truck type.

14. The multi-lane traffic management system for platoons of autonomous vehicles of claim 13, wherein said inter-slot distance that is calculated is 1 foot for all platoons associated with said car type; and, 5 feet for all platoons associated with said truck type.

15. The multi-lane traffic management system for platoons of autonomous vehicles of claim 1, wherein said inter-platoon distance that is calculated between a back of a platoon and a front of a next platoon of said truck type is between 30 feet and 40 feet; and, said inter-platoon distance that is calculated between a back of a platoon and a front of a next platoon of said car type is between 15 feet and 20 feet.

16. The multi-lane traffic management system for platoons of autonomous vehicles of claim 1, wherein said traffic controller separates cars and trucks into different platoons within each managed lane of said plurality of managed lanes, and allocate some of the plurality of managed lanes exclusively to cars.

17. The multi-lane traffic management system for platoons of autonomous vehicles of claim 1, wherein said each autonomous vehicle of different lengths is assigned to one or more consecutive slots, such that such that a cumulative length of the one or more consecutive slots that are assigned accommodates a length of the each autonomous vehicle.

18. The multi-lane traffic management system for platoons of autonomous vehicles of claim 1, wherein the traffic controller is allocates said each autonomous vehicle to an open slot of said open slots at the back of a platoon of said platoons, and subsequently repositions the each autonomous vehicle forward when a forward slot becomes unoccupied.

19. The multi-lane traffic management system for platoons of autonomous vehicles of claim 1, wherein said lane changes are enabled only when the each autonomous vehicle is aligned with an open slot of said open slots in the adjacent faster lane.

20. The multi-lane traffic management system for platoons of autonomous vehicles of claim 1, wherein the traffic controller dynamically manages open slot positions within said each platoon to ensure that unoccupied slots are positioned at the back of the each platoon.

* * * * *